United States Patent [19]

Davis et al.

[11] Patent Number: 5,305,240
[45] Date of Patent: Apr. 19, 1994

[54] COMPUTER CONTROLLED METHOD OF CALIBRATING AN X-Y SHIFTER

[75] Inventors: Alan R. Davis, Plainwell; Daniel P. Janecke, Kalamazoo; Leo A. Kominek, Portage, all of Mich.; Chiau-Chieh Ong, Kokomo, Ind.

[73] Assignee: Eaton Corporation, Cleveland, Ohio

[21] Appl. No.: 982,308

[22] Filed: Nov. 25, 1992

[51] Int. Cl.⁵ .................................. B60K 20/10
[52] U.S. Cl. .................. 364/571.01; 364/424.1; 73/1 R; 74/335
[58] Field of Search .......... 73/1 R; 364/424.1, 551.01, 364/575, 551.08; 74/335

[56] References Cited

U.S. PATENT DOCUMENTS

| | | | |
|---|---|---|---|
| 4,777,818 | 10/1988 | McMurtry | 73/1 R |
| 4,817,468 | 4/1989 | Leigh-Monstevens et al. | 74/335 |
| 4,849,888 | 7/1989 | Seto | 364/424.1 |
| 4,856,360 | 8/1989 | Yoshimura et al. | 74/335 |
| 4,873,881 | 10/1989 | Edelen et al. | 74/336 R |
| 4,899,607 | 2/1990 | Stainton | 74/335 |
| 4,911,031 | 3/1990 | Yoshimura et al. | 74/335 |
| 4,998,443 | 3/1991 | Janiszewski | 74/335 |
| 5,161,405 | 11/1992 | Macqueene | 73/1 R |

FOREIGN PATENT DOCUMENTS

0007112  1/1990  Japan .................................. 364/575

Primary Examiner—Jack B. Harvey
Assistant Examiner—Craig Miller
Attorney, Agent, or Firm—Brooks & Kushman

[57] ABSTRACT

Calibration of an X-Y shifter is accomplished under the control of a microcomputer which is programmed to perform a calibration routine each time the vehicle is shutdown. The routine causes the shifter's shift finger to be moved into touching contact with the various inner wall surfaces of the shift blocks of the respective transmission shift rails from which a calibrated shift rail and neutral position are calculated.

7 Claims, 10 Drawing Sheets

COMPUTER CONTROLLED METHOD OF CALIBRATING AN X-Y SHIFTER

TECHNICAL FIELD

This invention relates to electrically actuated X-Y shifting mechanisms and more particularly to a computer controlled method of calibrating such a shifter.

BACKGROUND ART

Electrically actuated X-Y shifting mechanisms for effecting change gear shifts in an automated mechanical transmissions are well known in the art. Such mechanisms typically include a plurality of substantially parallel, spaced-apart, axially movable shift rails each of which carry a shift fork which is associated with a positive clutch mechanism for selectively engaging or disengaging a first or second gear to a shaft. Typically shifting of the transmission is accomplished by selecting a shift rail by moving a shift finger axially or pivotally along an X—X axis into alignment with a shift block carried by the selected shift rail. Then the selected shift rail is axially moved to shift gears by axially moving or pivoting the shift finger to apply a force to the shift block in the direction of an axis Y—Y transverse to axis X—X. The shift finger is driven by electric motors, under the control of suitable electrical circuitry. See for example, U.S. Pat. No. 4,873,881, assigned to the assignee of the present invention, and hereby incorporated herein by reference. Such devices require calibration in order to insure that operation of the mechanism under software control produces accurate shifts. The calibration generally includes precise location of at least three rail positions and a neutral position. These positions are usually determined through a manual calibration procedure at the factory at the time of assembly which requires special equipment and detailed knowledge of the device. Moreover, temperature, component wear, and installation tolerances may cause the original calibration values to change over time. It is therefore desirable that these calibration values be updated periodically to insure optimal operation of the shifter.

SUMMARY OF THE INVENTION

In accordance with the present invention the problems associated with manual calibration are obviated by an automatic, tactile calibration method which insures maximum accuracy and performance over the life of the X-Y shifter.

More specifically, calibration of the X-Y shifter is accomplished under the control of an electronic control unit or microcomputer which is programmed to perform a calibration routine each time the vehicle is shutdown. The routine causes the shifter's shift finger to be moved into touching contact with the various inner wall surfaces of the shift blocks of the respective transmission shift rails and to calculate from the various limit or stop positions of the finger, the location of the X—X axis position of the shift rails and the Y—Y axis neutral position.

To locate the rail positions, the shift finger is driven, by an electric motor under the control of the microcomputer, to opposite ends of its travel in the X—X direction in the shift blocks to find the X—X direction inner wall limits. Then, for a three rail transmission, the calibrated center rail position is the average of the values of the two X—X direction limits. The calibrated position value for the two side rails is a known fixed distance on opposite sides of the calibrated center rail position.

To calibrate the neutral position of the shifter along the Y—Y axis, the shift finger is moved from the old or presently stored neutral position, forward and rearward along the Y—Y axis at each rail position into touching contact with the inner wall surfaces of each of the shift blocks. The calibrated neutral position value is then determined by averaging the forward direction position and the rearward direction position which are closest together.

BRIEF DESCRIPTION OF THE DRAWINGS

A more complete understanding of the present invention may be had from the following detailed description which should be read in conjunction with the drawings in which.

DETAILED DESCRIPTION OF PREFERRED EMBODIMENT

Figure 1:
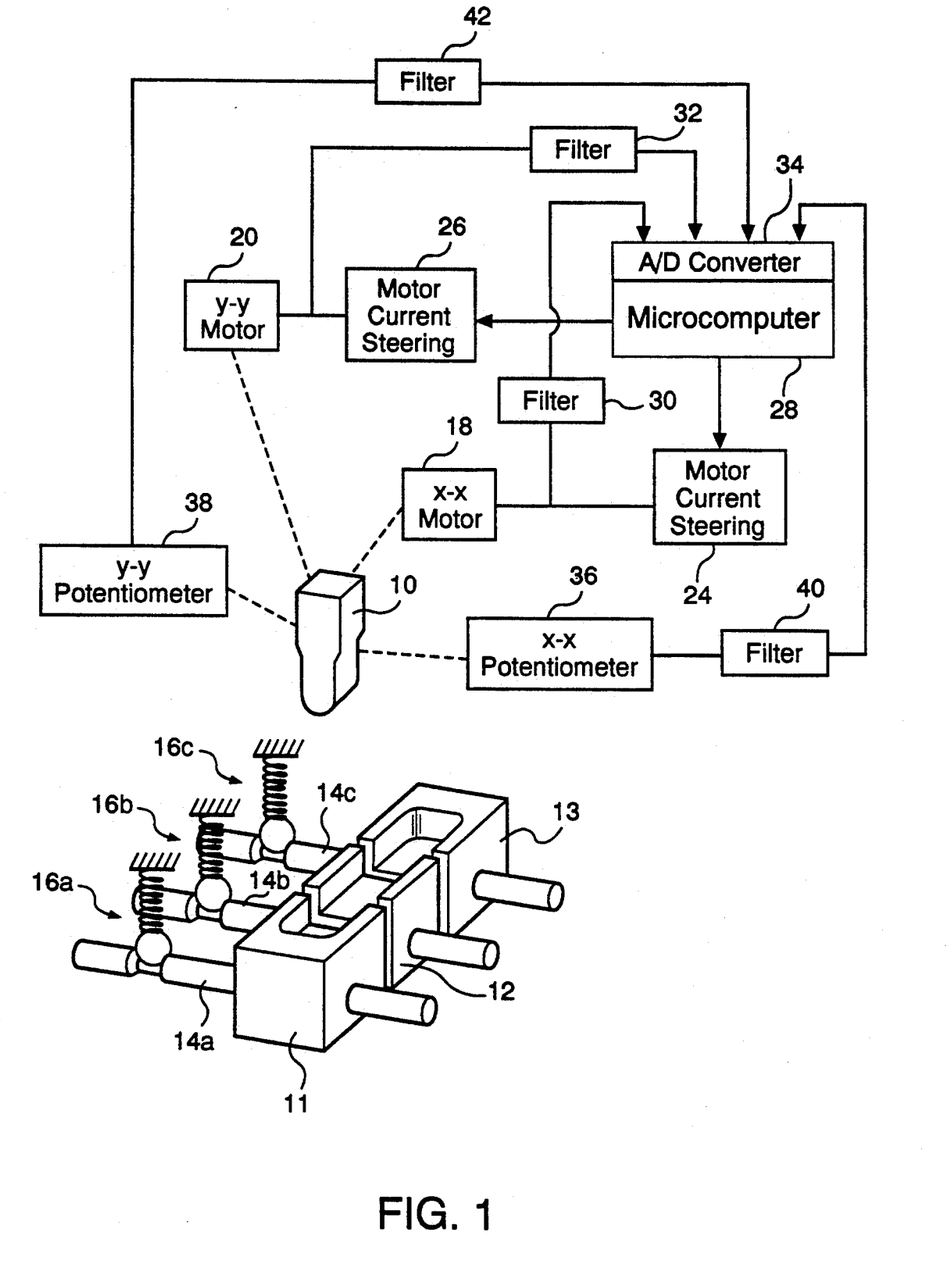
FIG. 1 is a schematic perspective view of a portion of an X-Y shifter showing the shift rails and the shift blocks as well as a block diagram of the control system for positioning the shift finger of the shifter.
Figure 2:
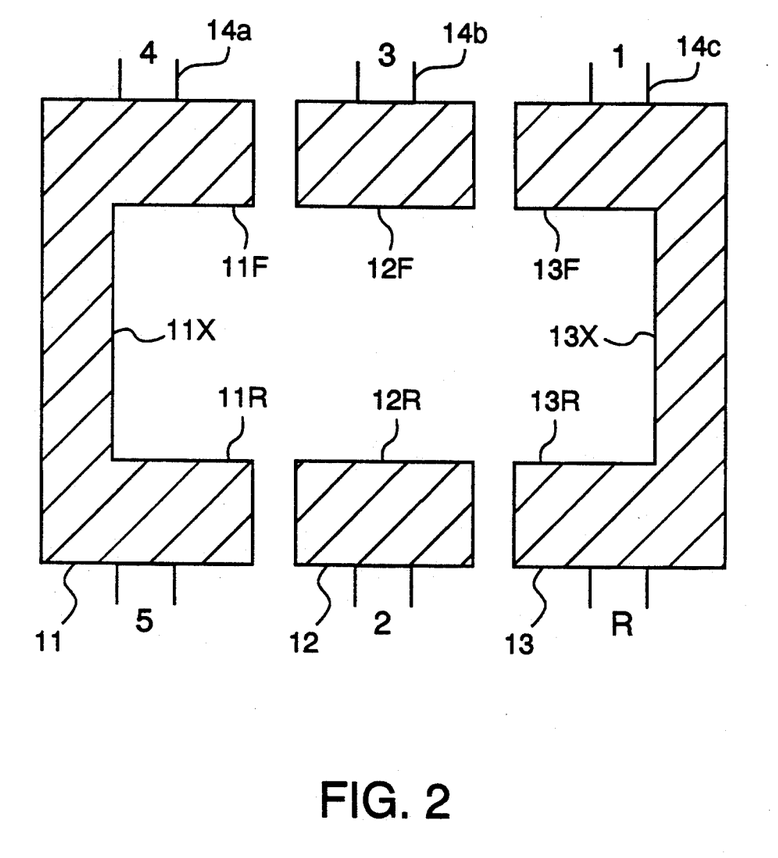
FIG. 2 is a cross sectional representation of the shift blocks.
Figure 3A:
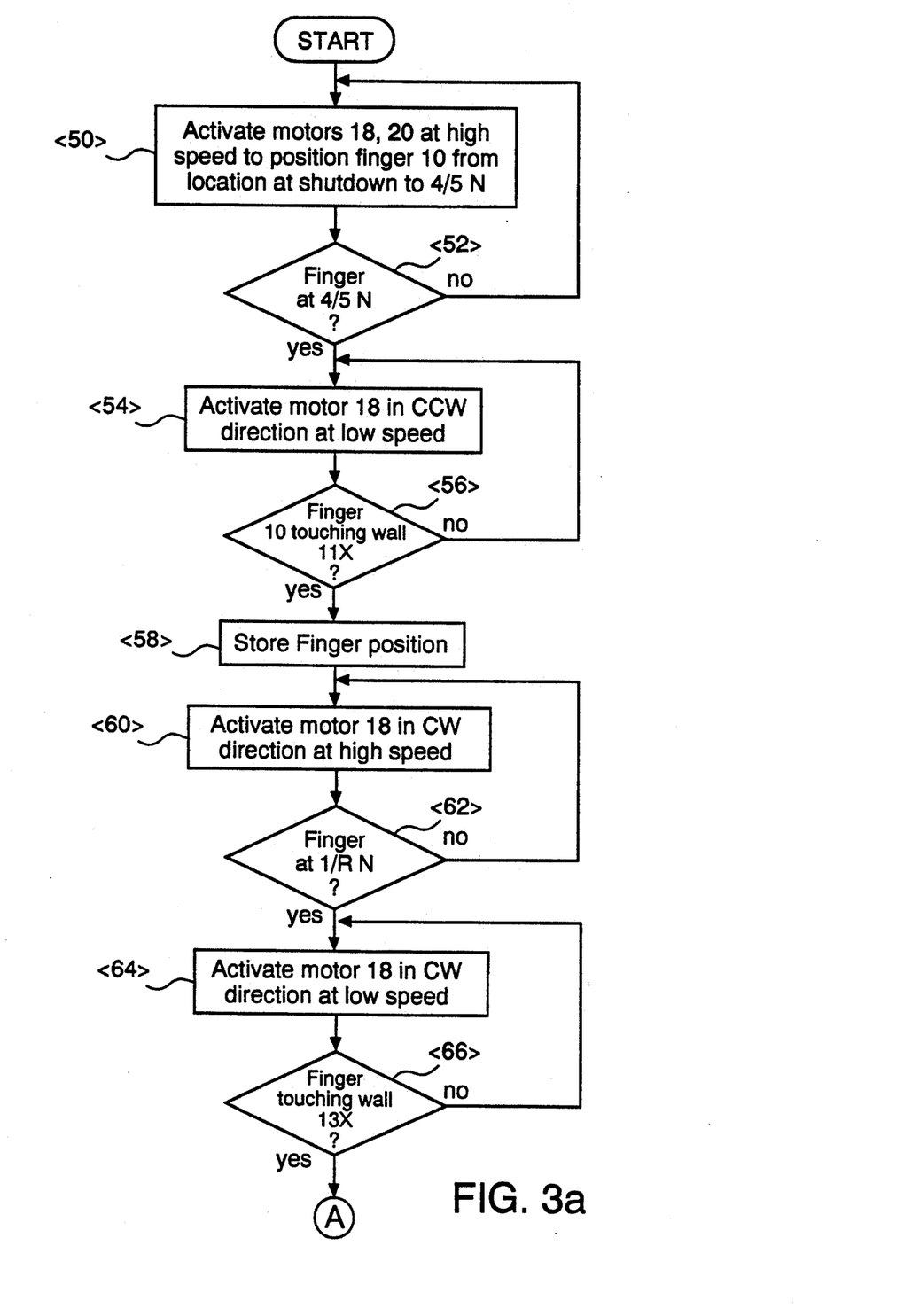
FIGS. 3a-3g is a flow chart of the calibration method of the present invention.
Figure 3B:
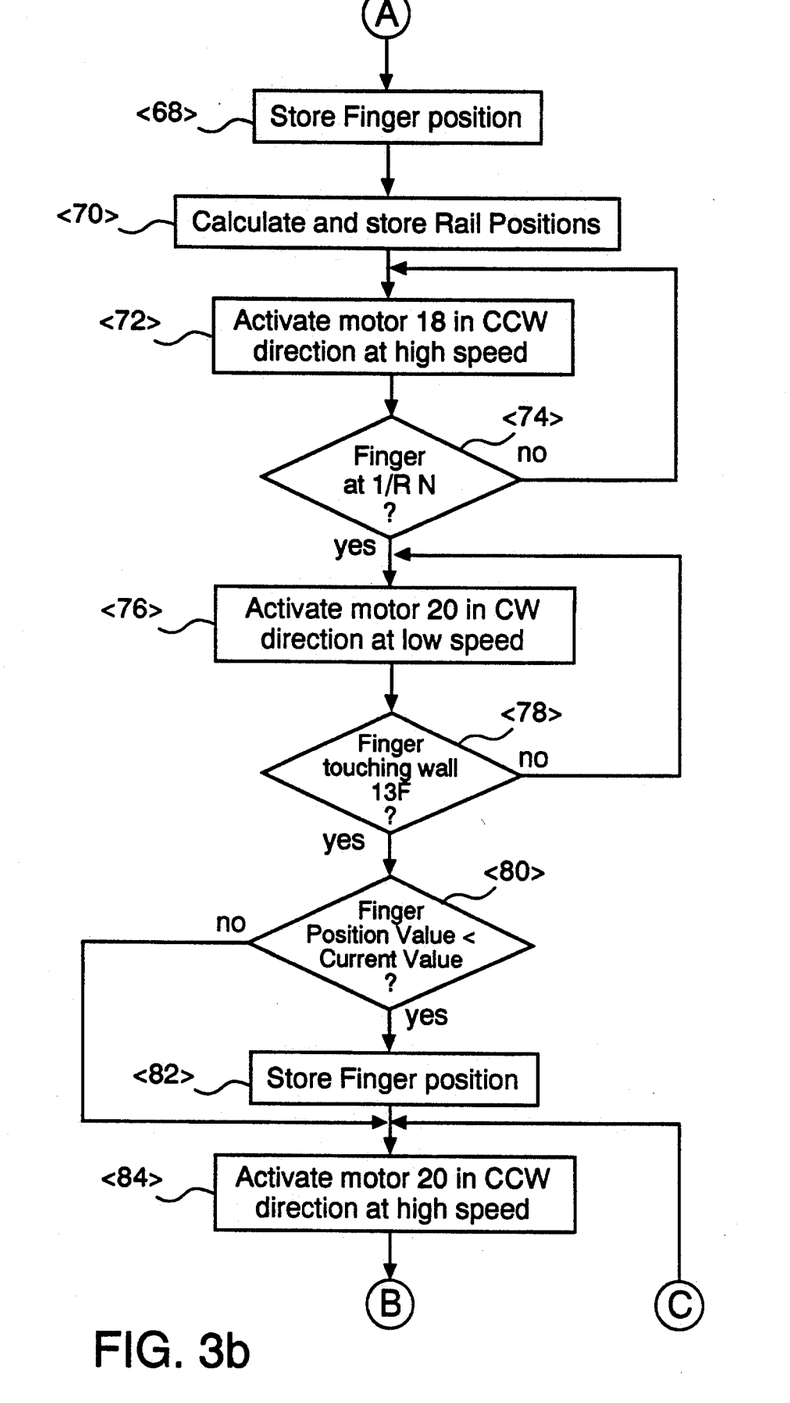
Figure 3C:
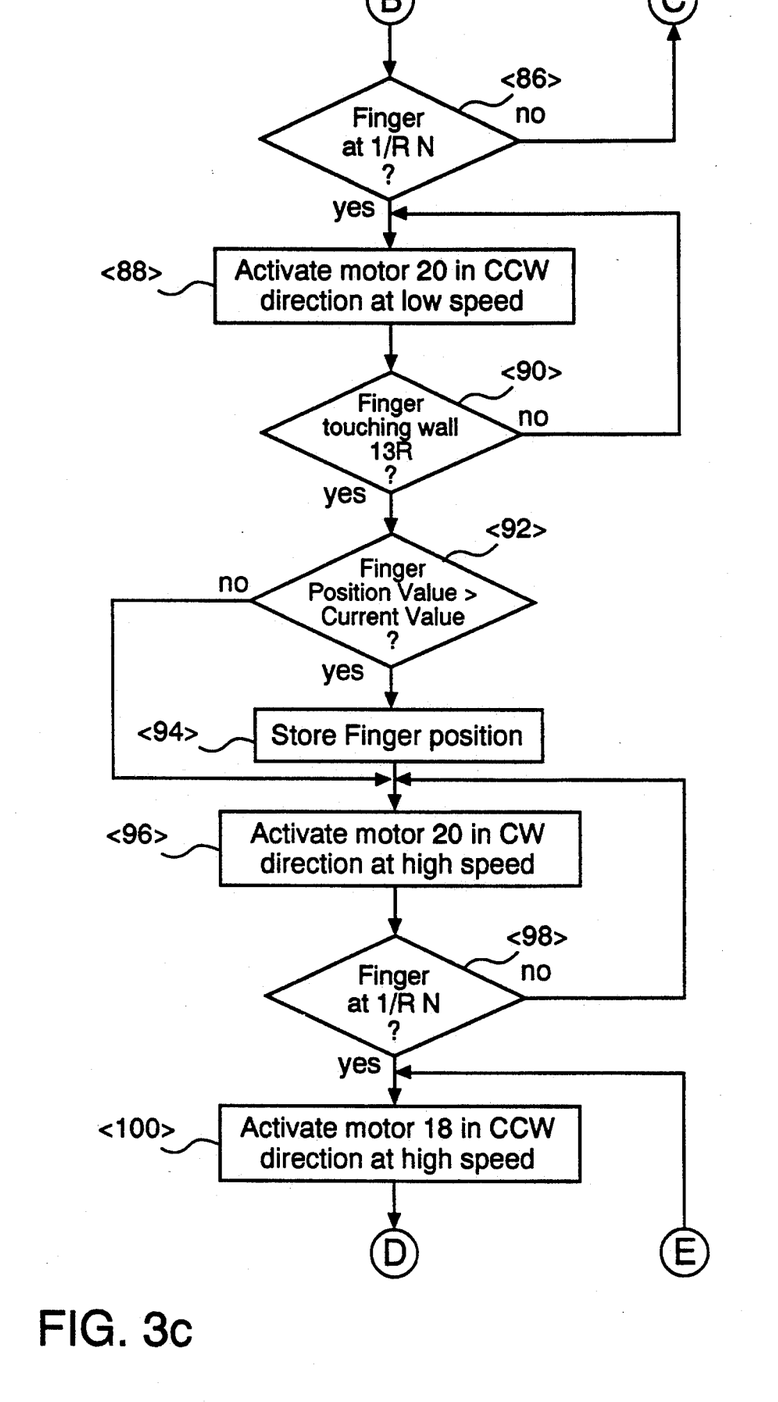
Figure 3D:
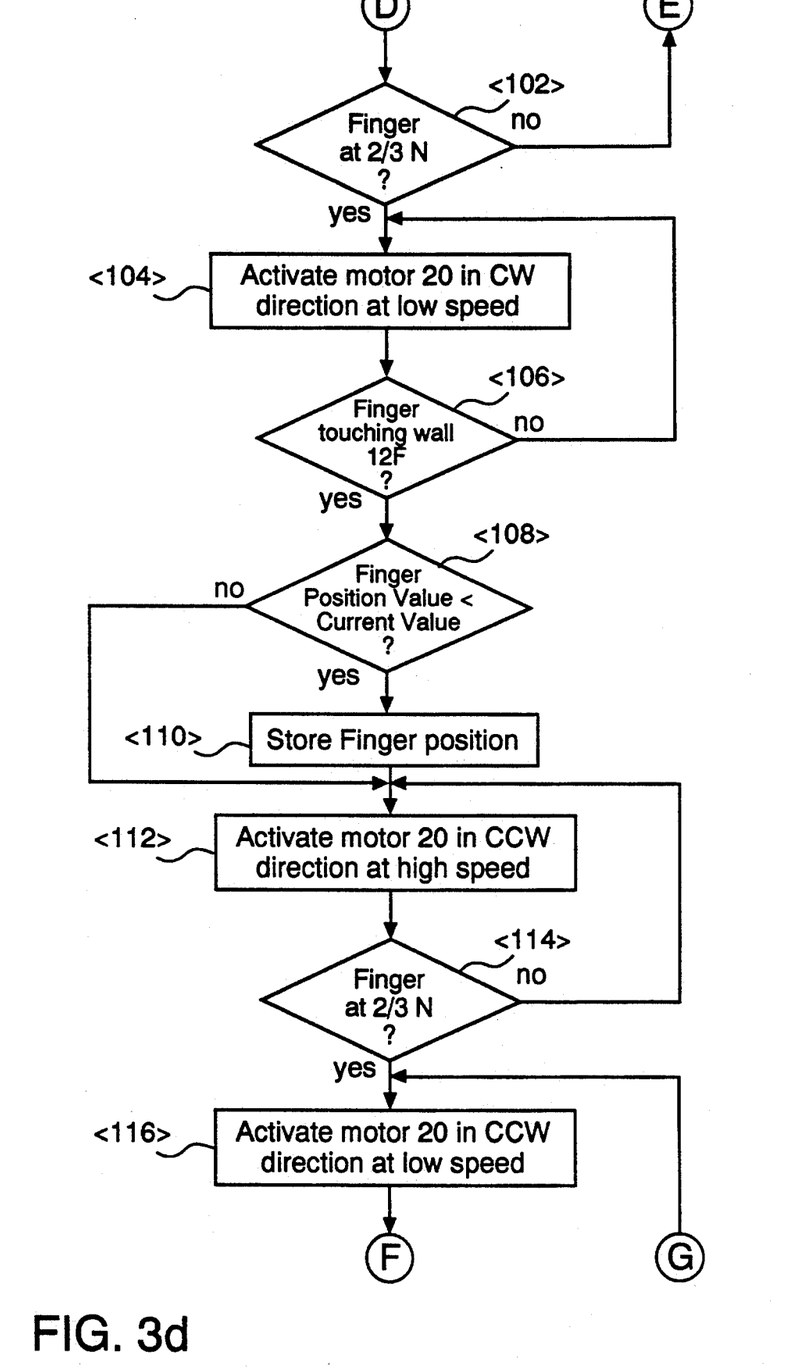
Figure 3E:
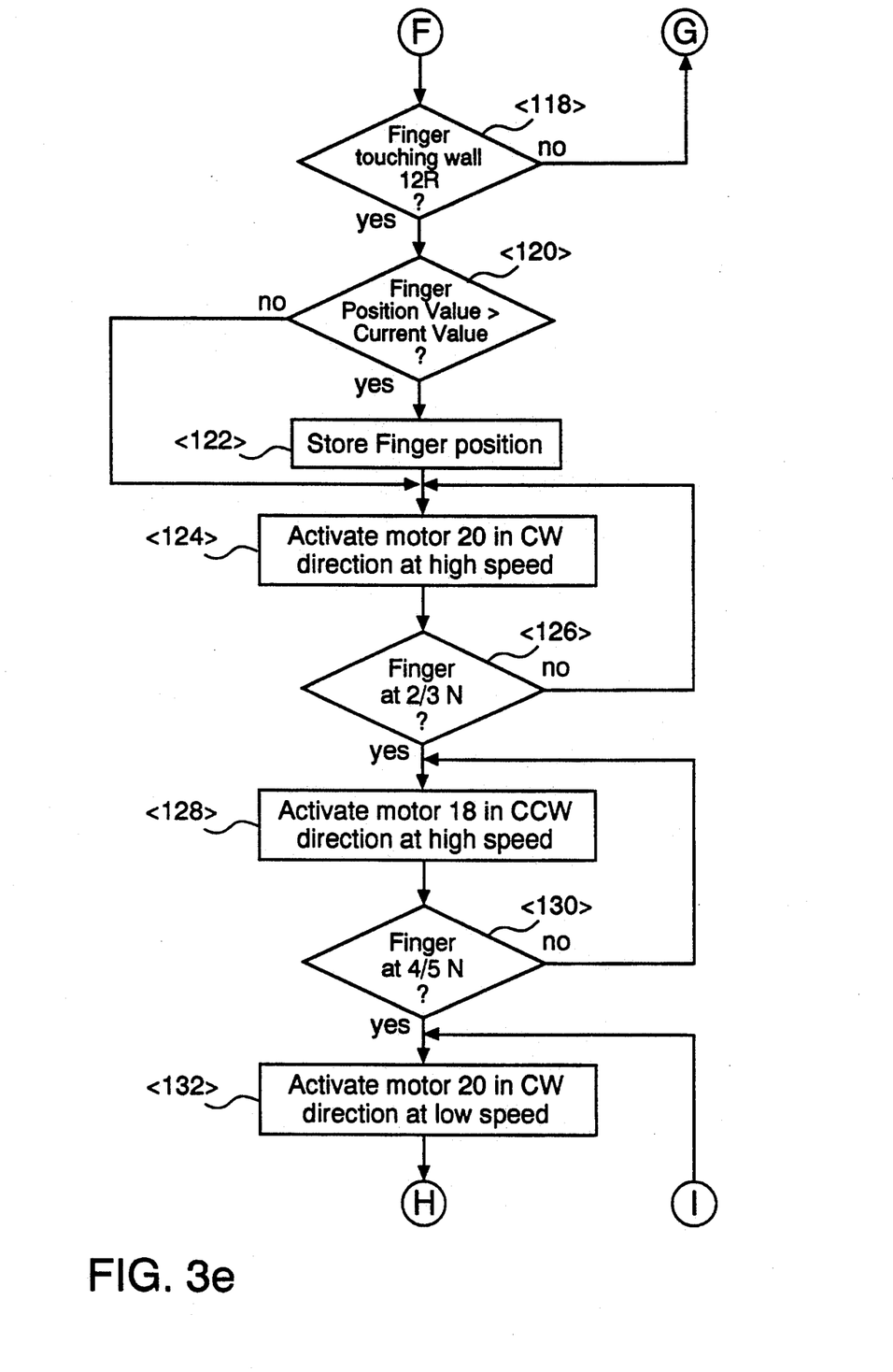
Figure 3F:
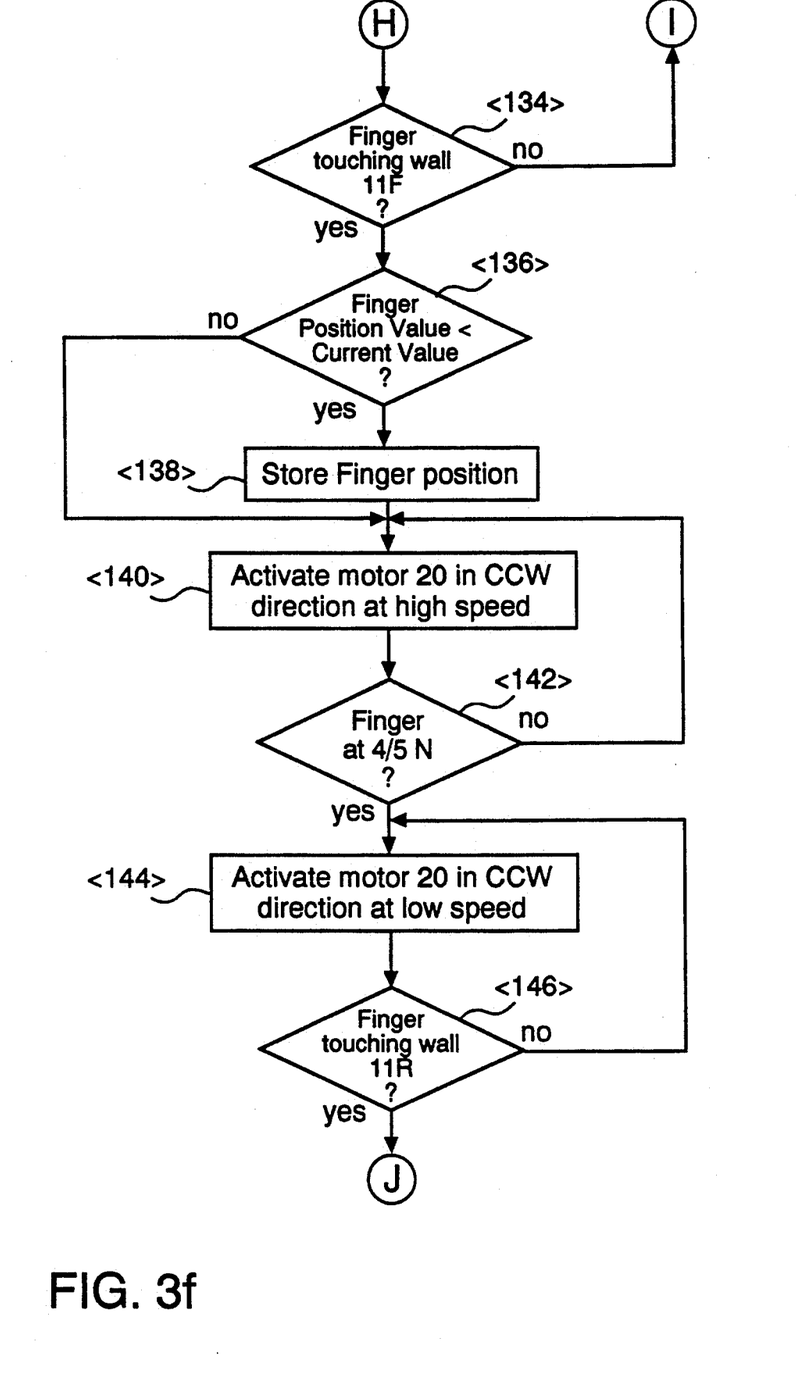
Figure 3G:
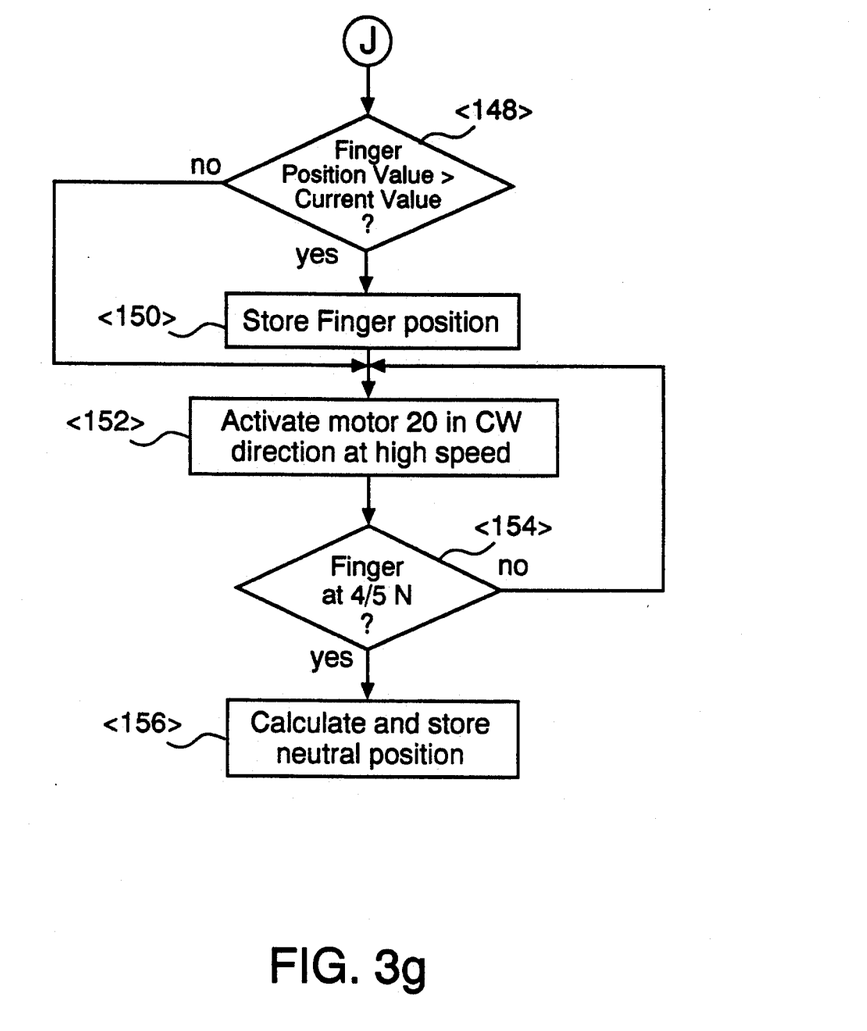

Referring now to the drawings and initially to FIG. 1, portions of an X-Y shifter such as disclosed in the aforementioned patent are shown and includes a shift finger 10 which is adapted to selectively contact the inner walls of shift blocks 11, 12, and 13. The shift blocks 11, 12, and 13 are respectively mounted on shift rails 14a, 14b, and 14c each of which has a detent position determined by detent mechanisms generally designated 16a, 16b, and 16c respectively. The finger 10 is coupled through appropriate mechanisms (not shown) to motors 18 and 20 which are adapted to move the finger in the X—X and Y—Y directions respectively, as explained in the aforementioned patent. Alternatively, a single motor and appropriate clutch and drive mechanisms may be used to selectively move the finger along the X—X and Y—Y axes as explained in the aforementioned patent.

The motors 18 and 20 are supplied with a variable duty cycle pulse width modulated (PWM) voltage through steering logic 24 and 26 under control of a microcomputer 28. The supplied voltage produces a current at the motors 18 and 20 which is measured and filtered at 30 and 32 respectively, and converted to a digital value by analog to digital converter 34 and input to the microcomputer 28. The microcomputer is programmed to compare the measured current with a desired current and any deviation or error in the measured current is corrected by varying the duty cycle to correct the error. The position of the finger 10 along the X—X and Y—Y axes is sensed by potentiometers 36 and 38 respectively, filtered at 40 and 42 respectively, converted to digital values and input to the microcomputer 28. The potentiometers 36 and 38 provide an output of from 0-5 volts over the range of shift finger movement. The output of the potentiometers is converted to binary words having a digital value of from 0-1023 digital counts. Preferably the range of readout along the X—X axis has a value of approximately 250-750 digital counts and along the Y—Y axis of approximately 300-700 digital counts.

The microcomputer 28 through the steering logic 24 and 26 controls the direction of motor rotation and through duty cycle variation controls the output torque and speed of the motors. Closed loop control of the current supplied to the motor as well as closed loop control of the position of the shift finger 10, permit the finger to be driven into touching contact with the inner walls of the blocks 11-13 with sufficient force to take up any backlash but without doing any damage to the finger, while also insuring that the detents 16a-16c are not overcome during the calibration process.

Referring now to FIGS. 2 and 3a-3g the procedure for calibrating the rail and neutral position of a three rail X-Y shifter is illustrated. The steps in the flowchart in FIG. 3 are indicated by numerals within angle brackets. The shifter provides gear selection for a transmission having 1st and Reverse gears selectable along shift rail 14c; 2nd and 3rd gears selectable along shift rail 14b; and 4th and 5th gears selectable along the shift rail 14a. It will be appreciated however that the calibration method is also applicable to transmissions with other gear combinations using a greater number of shift rails and associated shift blocks.

To calibrate the locations or positions of the rails 14a-14c, and their associated neutral positions, a "touch-touch" technique is employed. The calibration program of the microcomputer 28 is entered each time the vehicle is shutdown and initially <50,52> causes the finger 10 to be "pulled" i. e. moved at a relatively high speed from the position at shutdown to the currently stored 4/5 neutral position along the rail 14a. The motor 18 then moves the finger 10 at a relatively low speed <54> until the finger has stopped due to contact with the inner wall 11X <56> of the block 11 and this position bit value is stored in the microcomputer memory <58>. The finger 10 is then pulled to the 1/R neutral position <60,62> and thereafter moved at the low speed into contact with the inner wall 13X <64,66> of the block 13 and the bit value of this position is stored <68> in the memory of microcomputer 28. From these bit values, a calibration position value for rail 14b midway between the 11X and 13X positions is computed. The calibration position of the rails 14a and 14c may then be assigned a bit value which is a predetermined number of bits less than (in the case of rail 14a) and greater than (in the case of rail 14c) the bit value of the rail 14b. The calibrated positions of the rails 14a-14c are then stored in the computer memory <70>.

Neutral position calibration is accomplished by using the "touch-touch" technique from the present neutral position of each rail as stored in the computer memory. The finger 10 is first pulled by the motor 18 to the current 1/R neutral position <72,74>. Thereafter the motor 20 is activated to move the finger 10 at a low speed along the Y—Y axis into contact with the inner wall 13F <76,78>. If the bit value of the finger position is less than the value currently stored in computer memory <80>, the current value is updated i.e. replaced with the new value <82>, the direction of rotation of the motor 20 is reversed and the finger is pulled to the 1/RN position <84,86>. Thereafter the finger is moved at a low speed into contact with the inner wall 13R <90>. If the bit value of the finger position is greater than the current value stored in computer memory, the new value is stored <92,94> and the finger is pulled back to the 1/RN position <96,98>. Thus, two new bit values of positions 13R and 13F are found and updated.

The motor 18 is then energized to pull the finger 10 to the neutral position of the rail 14b i.e. ⅔N <100,102>. From the ⅔N position the procedure followed in locating the inner walls 13F and 13R is repeated to locate the positions of the inner walls 12F and 12R <104-122>. After updating as necessary the bit values of these two positions, the finger is pulled back to the 2/3N position by the motor 20 <124,126>. Finally, the finger is pulled to the 4/5N position <128,130> and the procedure previously described is followed to locate the inner walls 11F and 11R and store their respective bit values <132-148>. The finger 10 is then moved back to the neutral position 4/5N of the rail 14a <150,152>.

The computer 28 calculates and stores <154> the calibrated neutral position by averaging the minimum of the bit values for the finger at positions 11F-13F with the maximum of the bit values for the finger at positions 11R-13R. These two values represent the forward and rearward inner walls which are closest together. For example, if the bit values for the inner walls 11F, 12F and 13F are respectively 530, 542 and 538; and the values for the inner walls 11R, 12R, and 13R are respectively 480, 492 and 488 then the readings for the inner walls 11F and 12R are averaged to arrive at a calibrated neutral position of 511 digital counts.

Figure 4:
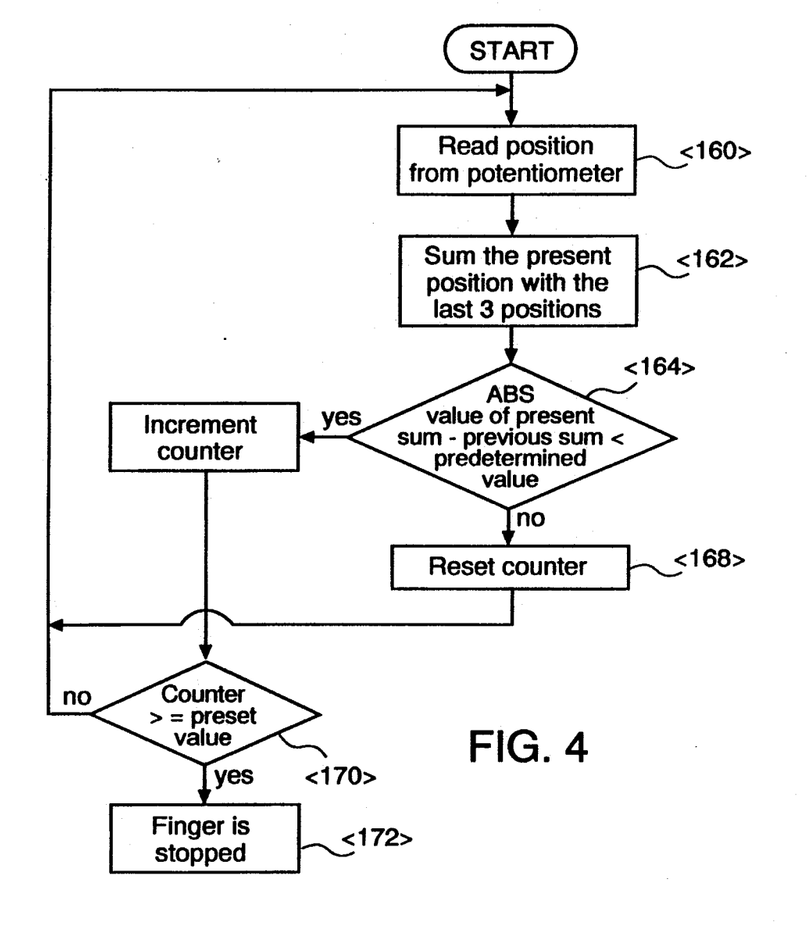
FIG. 4 is a flow chart of the position stop check approach used in the calibration method of the present invention.

A flow chart of the finger 10 position stop check is shown in FIG. 4. The potentiometer is read <160> and the value is summed <162> with the previous three readings. If the absolute value of the latest sum of the readings minus the value of the previous sum of the readings is less than a predetermined value <164> then a counter is incremented <166>, otherwise the counter is reset <168> and a new reading from the potentiometer is taken in due course. When the counter reaches a predetermined value of for example 5 then the finger is assumed to be in contact with one of the inner walls of the blocks 11,12,13 as indicated <170,172>, otherwise a new reading is taken. Thus, five consecutive potentiometer readings showing no change or only small changes from the previous readings are interpreted as contact of the finger 10 with an inner wall.

Figure 5:
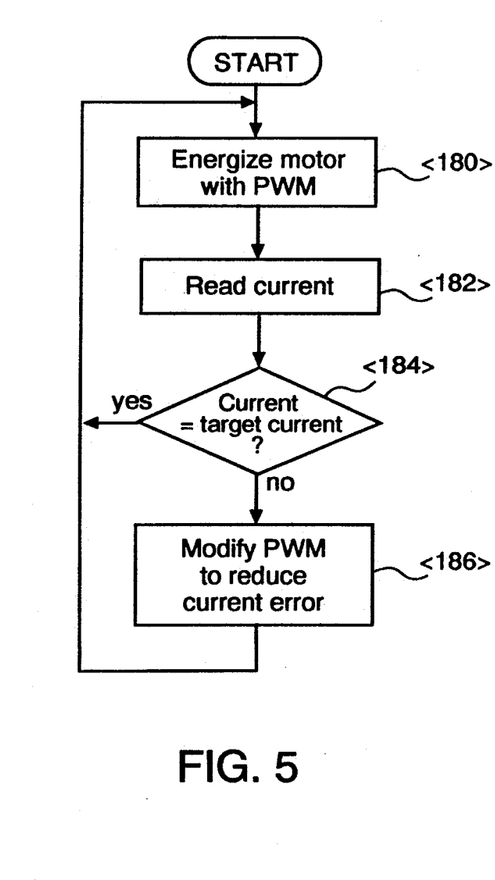
FIG. 5 is a flow chart of the motor current control used in the calibration method of the present invention.

A flow chart of the current control loop is shown in FIG. 5. The motor is energized with a variable duty cycle pulse width modulated voltage <80> and the magnitude of the current is read <182>. If the current does not equal a target current <184> the duty cycle is adjusted <186> to reduce the current error.

While the best mode for carrying out the invention has been described in detail, those familiar with the art to which this invention relates will recognize various alternative designs and embodiments for practicing the invention as defined by the following claims.

What is claimed is:

1. A computer controlled method of calibrating the neutral position of an electrically actuable X-Y shifting mechanism for a transmission, said shifting mechanism including a plurality of shift rails each having a shift block associated therewith, a shift finger movable left and right in an X—X direction for selecting one of said shift rails and movable in the Y—Y direction substantially transverse to said X—X direction for contacting forward and rearward inner wall surfaces of the shift block associated with the selected shift rail, motor means for moving said shift finger, said method comprising the steps of:

a. applying control signals to said motor means to move said shift finger to the current neutral position of each rail in a predetermined sequence and while at each neutral position to move said shift finger forward and rearward from the neutral position until the forward and rearward inner wall surfaces of each of the shift blocks is touched, b. storing the shift finger positions when touching the inner wall surfaces specified in step a.

c. calculating a new neutral position of said rails by averaging the forward direction position of said shift finger in step a. and the rearward direction position of said shift finger in step a. which are closest together.

2. The method defined in claim 1 wherein the shift finger positions of step b. are stored only if the position sensed in the forward direction is less than the previously stored position or the position sensed in the rearward direction is greater than the previously stored position.

3. The method defined in claim 2 wherein the control signal applied in step a. causes the shift finger to be moved at a relatively high speed to and between said current neutral positions and at a relatively low speed from said neutral positions to positions touching said inner walls.

4. A computer controlled method of calibrating an electrically actuable X-Y shifting mechanism for a transmission, said shifting mechanism including a plurality of shift rails each having a shift block associated therewith, a shift finger movable left and right in an X—X direction for selecting one of said shift rails and movable in the Y—Y direction substantially transverse to said X—X direction for contacting forward and rearward inner wall surfaces of the shift block associated with the selected shift rail, motor means for moving said shift finger, said method comprising the steps of:

a. applying control signals to said motor means while said shift finger is in a neutral position, to move said shift lever means into contact with said left and right inner wall surfaces in a predetermined sequence, b. storing the shift finger position upon touching said left and right inner wall surfaces, c. applying control signals to said motor means to move said shift finger to the neutral position of each rail in a predetermined sequence and while at each neutral position to move said shift finger forward and rearward from the neutral position until the forward and rearward inner wall surfaces of each of the shift blocks is touched, d. storing the shift finger positions when touching the inner wall surfaces specified in step c.

e. calculating the position of said plurality of shift rail as a function of the positions stored in step b. and the number of shift rails, and f. calculating a value for the neutral position of said rails by averaging the lowest forward direction position with the highest rearward direction position of the shift finger in step c.

5. The method defined in claim 4 wherein the shift finger positions of step d. are stored only if the position sensed in the forward direction is less than the previously stored position or the position sensed in the rearward direction is greater than the previously stored position.

6. A computer controlled method of calibrating an electrically actuable X-Y shifting mechanism for a transmission, said shifting mechanism including an inner shift rail, and first and second outer shift rails having respective inner, first and second outer shift blocks associated therewith, a shift finger movable left and right in an X—X direction for selecting one of said shift rails and movable in the Y—Y direction substantially transverse to said X—X direction for contacting and moving the shift block associated with the selected shift rail to effect a change gear shift, said inner and outer shift blocks left and right inner wall surfaces, each block mechanism having fore and aft inner wall surfaces, motor means for moving said shift finger in said X—X and said Y—Y directions, sensor means for detecting the location of said shift finger, computer means for monitoring said sensor means and for providing control signals to said motor means, said computer means including memory means storing data including data representing the select positions of said shift rails and the neutral positions for each rail, said method comprising the steps of:

a. applying control signals to said motor means, while said shift lever is in a neutral position, to move said shift lever means into contact with said left and right inner wall surfaces in a predetermined sequence, b. recording the output of said sensor means upon contact with said left and right inner wall surfaces, c. applying control signals to said motor means to move said shift finger to the neutral position of each rail in a predetermined sequence and while at each neutral position to move said shift finger forward and rearward from the neutral position until the inner wall surfaces on the block mechanism associated with each of said rails is contacted, d. recording data from said sensor means representing the location of said shift lever means upon contact with the inner wall surfaces specified in step c., e. calculating the value of the position of said inner rail by averaging the values of the recordings of step b., and calculating the position of the outer rails by offsetting the value of the inner rail position by a predetermined amount, f. calculating a value for the neutral position of said rails by averaging the lowest value of the positions of the shift finger in the forward direction as recorded in step d. with the highest value of the position of the shift finger in the rearward direction as recorded in step d.

g. recording the calculated values of steps e. and f. for use in subsequent positioning of the shift finger.

7. The method defined in claim 6 wherein the data is recorded in step d. only if the data sensed in the forward direction is less than the value of the corresponding previously stored data or the value of the data sensed in the rearward direction is greater than the value of the corresponding previously stored data.

* * * * *